United States Patent [19]

Hough

[11] Patent Number: 5,397,371
[45] Date of Patent: Mar. 14, 1995

[54] CONTAINER CHARGER

[75] Inventor: Richard M. Hough, Lansing, Mich.

[73] Assignee: Hough International, Inc., Albertville, Ala.

[21] Appl. No.: 168,516

[22] Filed: Dec. 16, 1993

[51] Int. Cl.$^6$ .............................................. B01D 46/00
[52] U.S. Cl. ...................................... 55/302; 55/341.6; 55/432; 414/21; 414/291
[58] Field of Search ...................... 55/270, 302, 341.6, 55/379, 429, 432; 414/21, 291

[56] References Cited

U.S. PATENT DOCUMENTS

| | | | |
|---|---|---|---|
| 4,227,903 | 10/1980 | Gustavsson et al. | 55/302 |
| 4,319,897 | 3/1982 | Labadie | 55/302 |
| 4,514,875 | 5/1985 | Comer | 55/302 X |
| 4,627,781 | 12/1986 | Borgner | 414/291 X |
| 4,737,269 | 4/1988 | Bischoff | 414/291 X |

*Primary Examiner*—Charles S. Bushey
*Attorney, Agent, or Firm*—Price, Heneveld, Cooper, DeWitt & Litton

[57] ABSTRACT

A charging apparatus for finely ground particulate materials such as drugs or vitamin concentrates to supplement animal feed and the like, enabling control of the materials, accounting of the particulate materials being dumped and inhibiting exposure of workers to the materials, comprising an integral assembly having a suction fan above the hopper into which the material is dumped through an inlet opening, and bag filters between the hopper and the suction fan, as well as between the inlet opening and the suction fan. These bag filters collect air-entrained material dust into a layer which is discharged into the hopper by a momentary reverse flow of air through venturi nozzles to reclaim the material. The contents to be dumped can be weighed accurately and dumped in a fashion meeting OSHA standards and FDA requirements. The unit preferably is on tracks movable from one bin to the next. The interior of the structure has a suspended baffle which inhibits short circuiting of air from the product inlet to the suction unit. It also has a suspended flexible baffle adjacent the product inlet to prevent sudden outward displacement of air back through the product receiving opening when product is being dumped, preventing material from billowing out of the opening where the material enters. Bag filters and venturi flow nozzles facilitate a momentary reverse flow of air to discharge the layer of captured particulate material from the bag filters into the hopper.

9 Claims, 2 Drawing Sheets

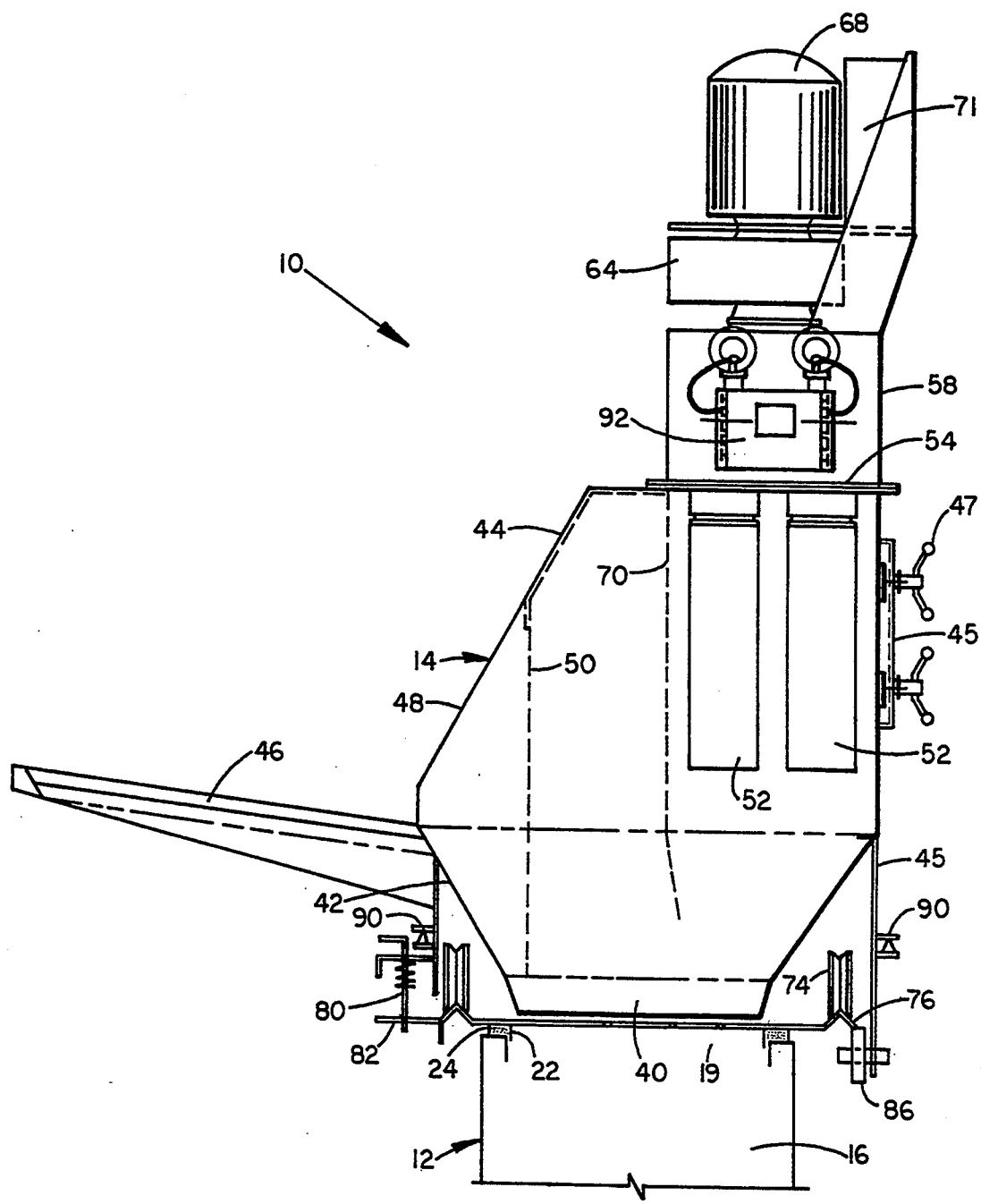
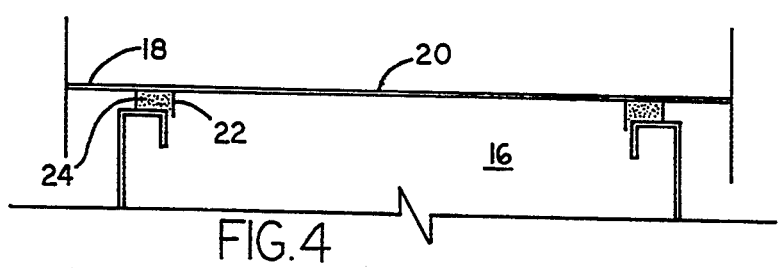

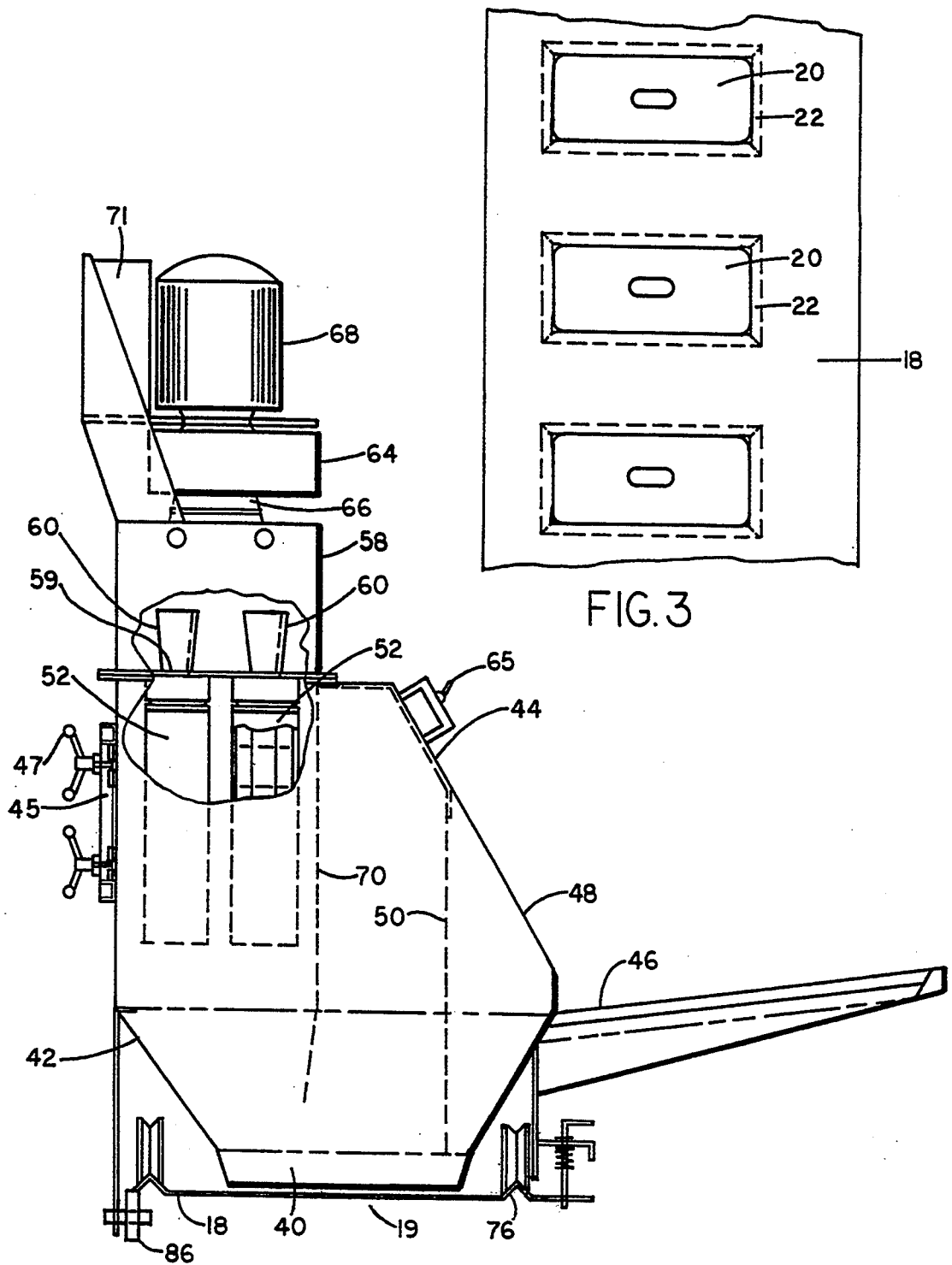

CONTAINER CHARGER

BACKGROUND OF THE INVENTION

This invention relates to apparatus for charging finely ground particulate materials such as potent animal feed additives or drugs into bins, e.g., very small or "micro" bins. Feed additives such as drugs and/or vitamin concentrates are typically finely ground particulate material received in bag- or box-type containers. When these are to be weighed out, e.g., to be mixed or to be mixed with feed, a container of the finely ground material is placed on a platform and weighed, and then dumped into a bin. This creates two potential difficulties. One difficulty is the exposure to workmen of the potent fine dust that tends to billow up into the atmosphere with dumping and consequential air displacement, to be possibly breathed by the operator and others. In fact, OSHA requirements now restrict such exposure of workers. Conventional equipment often employs a ventilation stack system with filters at the outlet in efforts to limit dissemination of the dust. The second difficulty is the FDA requirement of accounting for all of the potent chemicals such as drugs and vitamin concentrates. Loss of particulate material into the atmosphere, or clinging to equipment or filters in a discharge stack, is almost impossible to prevent using present equipment, and thus almost impossible to fully account for to the FDA. Such losses are also costly.

SUMMARY OF THE INVENTION

BRIEF DESCRIPTION OF THE DRAWINGS

FIG. 1 is a side elevational view of the novel apparatus;

FIG. 2 is a side elevational, partially sectional view of the apparatus in FIG. 1, from the opposite side;

FIG. 3 is an enlarged, fragmentary, plan view of the central portion of the multiple bin arrangement forming part of the assembly in FIG. 1; and FIG. 4 is an enlarged, fragmentary, sectional, elevational view of the portion of the bin assembly in FIG. 3.

DESCRIPTION OF THE PREFERRED EMBODIMENT

Referring now specifically to the drawings, the complete assembly 10 there depicted includes a bin subassembly 12 and a charging and filtration unit subassembly 14 thereabove.

Subassembly 12 is shown to include a plurality of side-by-side bins 16 having a bin cover plate 18 (FIG. 3) over the top of all of the bins, with openings 19 in cover plate 18 above the respective bins temporarily covered by individual removable covers 20 (FIG. 3). Each cover 20 rests upon a peripheral frame 22. The frame 22 and openings 19 into the bin have basically square corners, while covers 20 have rounded corners. The edges of covers 20 slightly overlap frames 22 such that particulate material cannot build up between the cover and the frame. A peripheral resilient gasket 24 is positioned beneath cover plate 18 and the underlying bins 16 (FIGS. 1 and 4). No gasket is necessary between the bin and the bottom of the hopper, for reasons to be explained.

Openings 19 in bin cover plate 18 basically are each slightly larger in size and generally the same in configuration as the bottom outlet 40 of tapered hopper 42 of charging and filtration unit subassembly 14. Subassembly 14 is an integral unit, having a product reception housing 44 which is integral with and extends up from the top of tapered hopper 42. Extending forwardly from housing 44 is a generally horizontal support platform 46 for supporting containers, e.g., a bag or a box, of particulate material to be dumped into housing 44 and hopper 42 in a manner to be described hereinafter. This support platform is preferably sloped slightly downwardly toward housing 44, and specifically toward a product receiving opening 48 in housing 44. This opening 48 is above platform 46 and extends substantially up to the upper edge of a suspended flexible baffle 50. Baffle 50 is suspended within the housing and across the housing to separate most of the housing interior from opening 48. This flexible baffle extends almost to the bottom of hopper 42. The location of this flexible baffle prevents a sudden outward displacement of air and dust which might otherwise occur when material is being dumped from platform 46 into the hopper, i.e., prevent dust laden air from billowing out opening 48 into which the product is being dumped.

Suspended within the space of housing 44 are a plurality of bag-type filters 52. These are suspended from a top closure plate 54 which closes off the upper part of housing 44 except for a plurality of openings 59 through the top of the filters. These openings 59 are communicant with the interior of venturi housing 58 which is above product reception housing 44. This venturi housing contains a plurality of venturi conduits 60 (FIG. 2) which extend upwardly from the respective openings 59 and respective individual bag filters 52. The lower ends of venturi conduits 60 are smaller in diameter than the diameter of bag filters 52 connected therebeneath. The open upper end of the venturi conduits all communicate through a flexible sleeve 66 with a suction fan 64 thereabove. Fan 64 is driven by electric motor 68 above it, and may have an exhaust stack 71. At the rear of product reception housing 44 is an access door 45 controlled by actuators 47, to allow access to bag filters 52 by an operator, as necessary.

In housing 44, between bag filters 52 and opening 48 in the front of the housing, is a second transverse baffle 70, preferably of metal, suspended from its upper edge, spaced inwardly from and parallel to flexible baffle 50. This baffle 70 prevents air flow from being short circuited from front opening 48 directly to bag filters 52, but rather causes air to flow downwardly from opening 48 to the bottom area of hopper 42 and then upwardly to the bag filters, to thereby efficiently entrain any suspended dust particles and draw them to the bag filters rather than allowing the dust particles to exit through opening 48.

Subassembly 14 may be utilized in combination with only a single bin, but preferably is used in combination with a multiple of in-line bins such as those depicted in FIG. 3. To do this, subassembly 14 is normally mounted as on trolley wheels 74 which ride along linear elongated parallel tracks 76, e.g., formed into cover plate 18. An indexing locking device such as the spring biased pin 80 and cooperative openings in index plate 82 enable locking of subassembly 14 at particular individual bins in alignment of hopper outlet 40 with the respective bin opening 19. Beneath tracks 76 at the rear of the subassembly 14, i.e., opposite platform 46, is one or more hold down wheels 86 which are rotatably attached to the base panel 45 of housing 44, and engage the underside of cover plate 18 to prevent subassembly 14 from tipping forwardly when product weight is applied to platform 46. Subassembly 14 also preferably includes load cells 90 (FIG. 1) suspending the unit for directly weighing material placed on platform 46 and to be dumped into hopper 42.

Beneath suction fan 64 and above venturi units 60 is a reverse flow jet air cleaner control 92. This component may comprise a suitable solenoid shifted valve, or the equivalent, for changing the air flow direction momentarily from upwardly to downwardly through venturi conduits 60 and bag filters 52. This reverse flow function can be actuated by moving a three position switch 65 to a "reverse" location. The other two locations for the switch are "off" and "forward," i.e., suction.

In operation, subassembly 14 is positioned over an opening 19 of a bin from which cover 20 has been temporarily removed. If subassembly 14 is mounted to move on trolley wheels 74, it is index locked into position with the spring biased pin 80 and orificed index plate 82. The system is activated by moving switch 65 from the off position to a forward, i.e., suction position, thereby activating motor 68 which drives suction fan 64 to draw air from the area of opening 48 around the bottom of fixed baffle 70 and upwardly through hopper 42, product reception housing 44, bag filters 52, venturi conduits 60, venturi housing 58, to the suction fan 64 and out stack 71. Air drawn in this fashion flows inwardly of housing 44 through opening 48, as well as around the periphery of bin opening 19 into hopper bottom 40 so that a seal is not necessary between the bottom of the hopper and the individual bin. A container of the particulate material such as drugs or concentrated vitamins is placed on platform 46 and weighed utilizing load cells 90. It then is dumped through product reception opening 48 of housing 44, the flexible baffle 50 shifting inwardly to allow the particulate material to fall through tapered hopper 42 and its outlet 40 into the respective bin 16, this baffle 50 also preventing a gush of air flowing back out through opening 48. Material dust entrained in the air is drawn by fan 64 to bag filters 52 where a layer of material can form. To ultimately conserve the particulate material that has been drawn to the surface of the bag filters, reversing unit 92 is momentarily actuated by shifting switch 65 to its third position, causing reverse air flow momentarily downwardly from housing 58, through venturi conduits 60, and into the larger diameter bag filters 52. It has been found that these venturis positioned above the bag filters causes the air to expand coming from the venturi nozzle into the filters to effectively discharge the layer of particulate material from the exterior of the bag filters, causing this material to drop down into hopper 42 and thus the bin beneath it. When no further material is to be dumped into that particular bin, subassembly 14 can be moved to the next respective bin for dumping of the next respective container or containers.

By utilizing this apparatus, the operator is protected from breathing the potent particulate materials. Further, auditing account can be made of all of the materials. The suspended material drawn to the bag filters can be reclaimed quickly and easily.

Those familiar with this field may well contemplate other advantages as well as certain modifications to be made to the illustrated preferred embodiment of the invention to suit a particular installation. Hence, the invention is not intended to be limited solely to the preferred embodiment disclosed as exemplary of the invention, but only by the scope of the appended claims and the reasonably equivalent structures to those defined therein.

The embodiment of the invention in which an exclusive property or privilege is claimed are defined as follows.

I claim:

1. A particulate material charging and filtration unit for charging bin containers with particulate materials, comprising:
   a product reception housing defining an interior space and a product receiving opening to said space to allow particulate material to be dumped through said opening;
   a hopper at the base of said housing to receive the particulate material, and having a bottom outlet to a bin container;
   a motor driven suction fan and conduit in communication with said housing and said hopper to create a suction from said housing;
   bag filters mounted in said housing between said product receiving opening and said suction fan, and between said hopper and said suction fan for collecting particulate material drawn toward said suction fan;
   a baffle between said product receiving opening and said filters and positioned to cause air flowing to said suction fan to flow from said product receiving, opening around said baffle and across said hopper before flowing through said filters to said suction fan;
   said bag filters suspended in said housing above said hopper, said bag filters having venturi conduits between said filters and said suction fan, and said suction fan being momentarily reversible to create a momentary reverse air flow through said venturi conduits and said bag filters for air purging of particulate material from said bag filters to fall into said hopper.

2. The charging and filtration unit in claim 1 including a flexible baffle suspended adjacent said product receiving opening to inhibit reverse displacement flow of air from said hopper and housing through said product receiving opening tending to be caused by sudden displacement of air with particulate material being dumped through said opening.

3. The charging and filtration unit in claim 1 including an external platform mounted to and extending from said housing adjacent said opening for supporting a container of particulate material to be dumped through said opening.

4. The charging and filtration unit in claim 3 including load cells for weighing material on said platform.

5. The charging and filtration unit in claim 3 in combination with a plurality of bins beneath said hopper bottom outlet, each said bin having a top opening; and
   tracks to guide said unit into position over respective ones of said bin top openings.

6. The charging and filtration unit in claim 5 including a bin cover plate beneath said hopper bottom outlet, covering said plurality of bins, and containing said bin openings; and
   a bin cover for each said bin opening.

7. The charging and filtration unit in claim 6 wherein each said bin opening has square corners, and each said bin cover has rounded corners.

8. The charging and filtration unit in claim 6 including a gasket between said bin cover plate and said bins.

9. The charging and filtration unit in claim 8 including a space between said cover plate and said hopper for air flow therethrough up to said suction fan.

* * * * *